United States Patent [19]

Fasano

[11] 4,263,999
[45] Apr. 28, 1981

[54] DEVICES FOR THE AUTOMATIC ELIMINATION OF PLAY IN MOTOR VEHICLE CLUTCHES

[75] Inventor: Osvaldo Fasano, Villarbasse, Italy
[73] Assignee: START S.P.A. Studi Apparecchiature e Ricerche, Turin, Italy
[21] Appl. No.: 972,173
[22] Filed: Dec. 21, 1978
[51] Int. Cl.³ .............................. F16D 13/75
[52] U.S. Cl. .................................. 192/111 A
[58] Field of Search .......... 192/111 A, 111 R, 111 B, 192/70.25; 188/71.8, 79.5 GC, 79.5 K

[56] References Cited

U.S. PATENT DOCUMENTS

| | | | |
|---|---|---|---|
| 3,365,042 | 1/1968 | Smirl et al. | 192/111 A |
| 3,430,745 | 3/1969 | Randol | 192/111 A |
| 3,895,538 | 7/1975 | McGregor | 188/79.5 K |

FOREIGN PATENT DOCUMENTS 591338  2/1978  U.S.S.R. .............................. 192/111A

Primary Examiner—George H. Krizmanich
Attorney, Agent, or Firm—Sughrue, Rothwell, Mion, Zinn & Macpeak

[57] ABSTRACT

A device which automatically eliminates play due to wear of a motor vehicle clutch by the engagement, during a working stroke, of a pawl carried by a control arm with teeth on an intermediate member and subsequent disengagement of said pawl upon return of the control arm to its rest position, due to the abutment of a first stop, carried by a connecting arm, with a second stop, which allows a release spring to disengage the pawl, thereby allowing the intermediate member to assume a play-eliminating position prior to the next working stroke.

5 Claims, 9 Drawing Figures

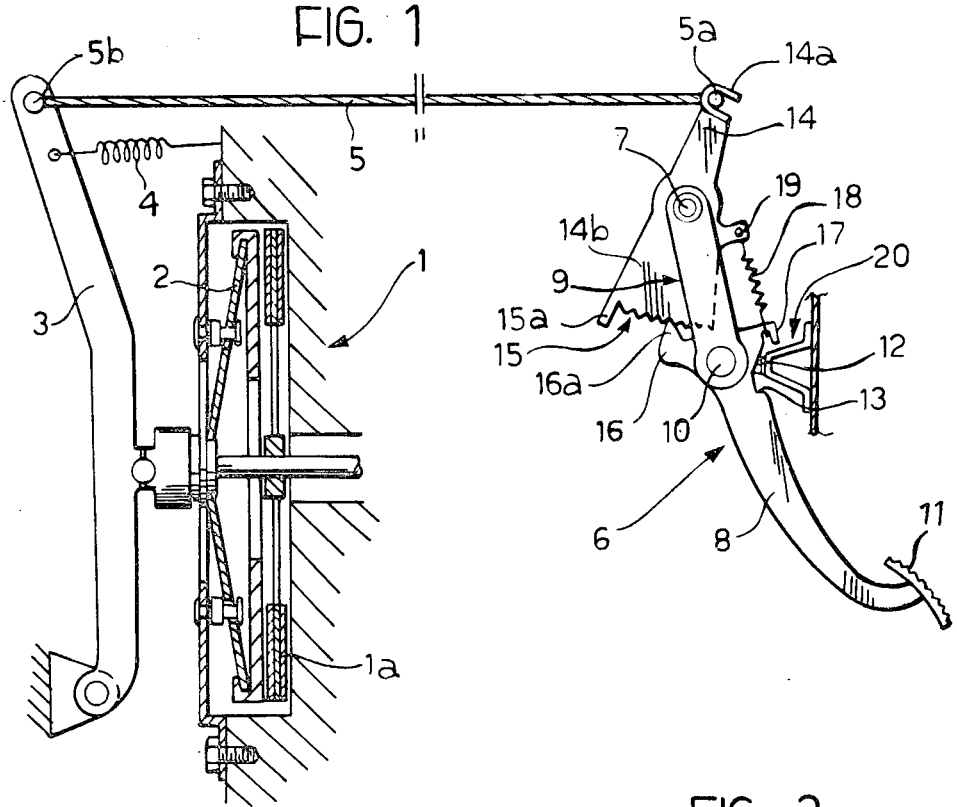
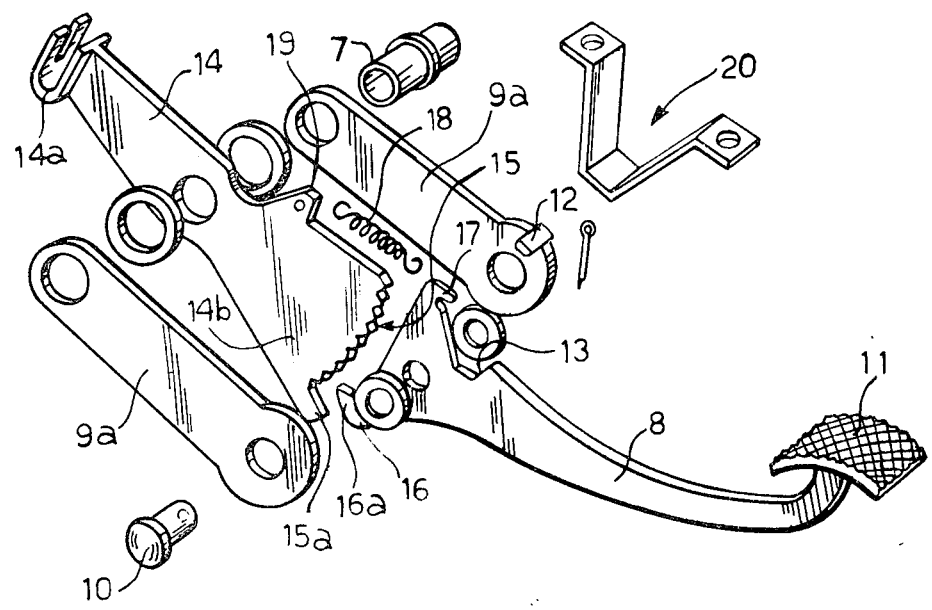

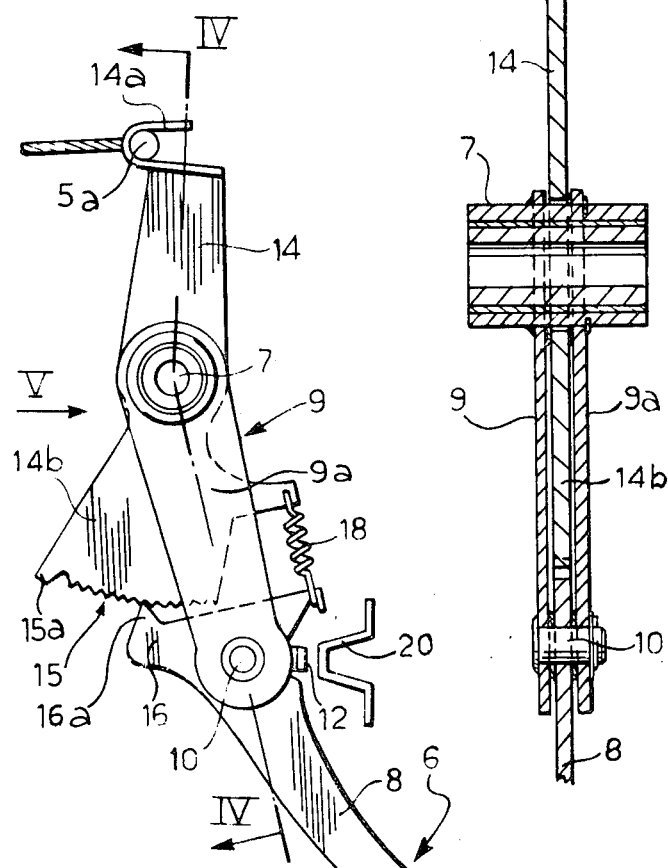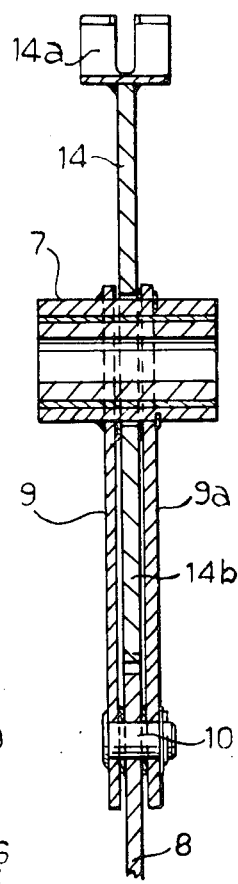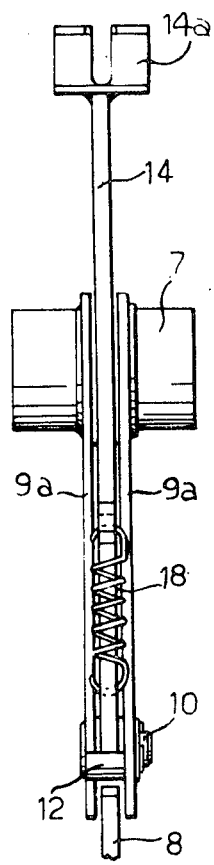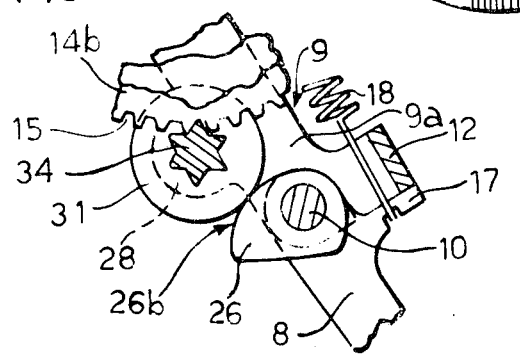

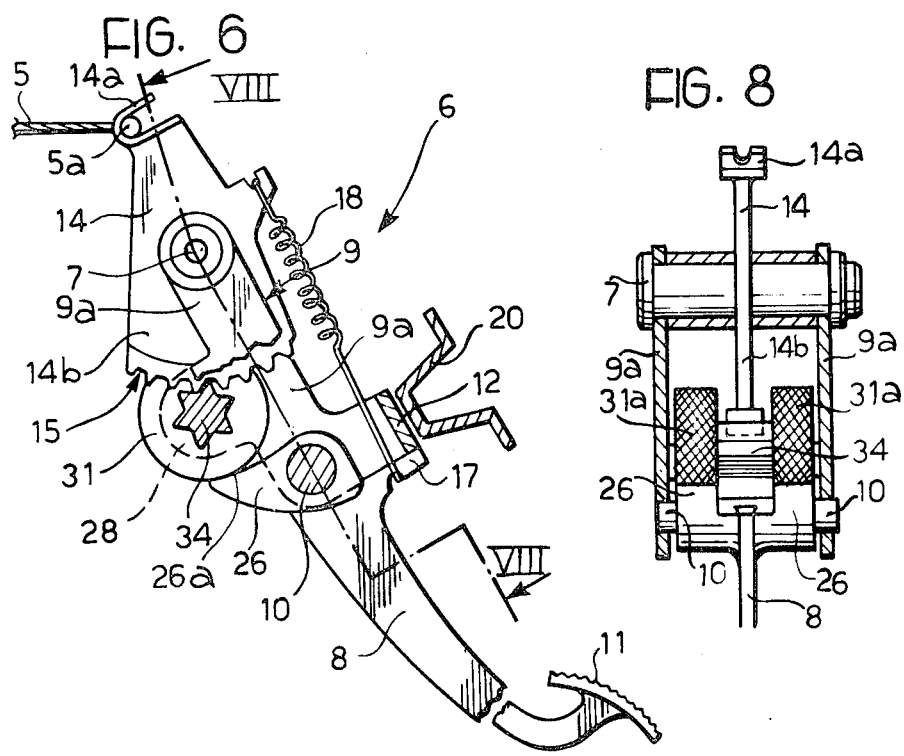
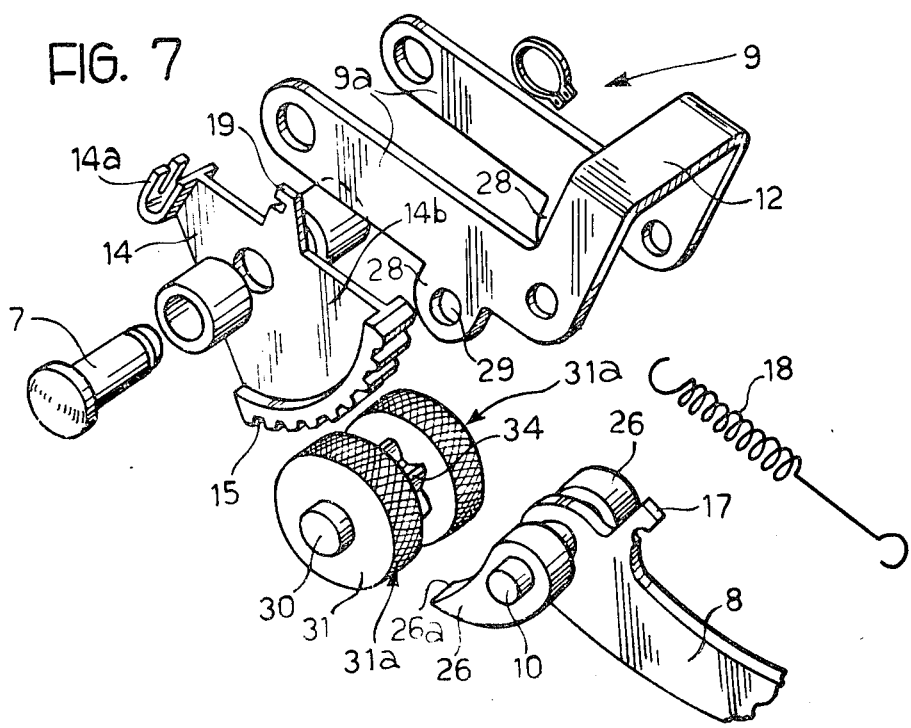

DEVICES FOR THE AUTOMATIC ELIMINATION OF PLAY IN MOTOR VEHICLE CLUTCHES

The present invention relates to devices for the automatic elimination of play in motor vehicle clutches.

More particularly, the invention is concerned with devices for the automatic elimination of play in motor vehicle clutches of the type comprising a declutching lever, a control lever operable by a driver of the vehicle to effect disengagement of the clutch through an intermediate member, articulated to the control lever, and a cable, one end of which is fixed to the intermediate member and the other end of which is fixed to the declutching lever, locking means which effect interengagement of the control lever and the intermediate member to prevent their relative rotation, and releasing means for disengaging the locking means to disengage the intermediate member from the control lever, when the latter is in a rest position, to enable the intermediate member to assume a rest position, allowing play resulting from clutch wear to be taken up.

The object of the present invention is to provide a device of the above specified type, which is of simple construction and is reliable and safe in operation.

According to the present invention there is provided a device for the automatic elimination of play in motor vehicle clutches of the aforesaid type, characterised in that (a) the control lever comprises first and second parts connected by a pivot, the first part being a control arm having at one of its ends a pedal to which clutch disengaging force is applied, and the second part being a connecting arm interconnecting the control arm and the intermediate member;

(b) the locking means comprise at least one arrestor element carried by the control arm, and a toothed locking element cooperating with the or each arrestor element to be locked selectively with teeth on the intermediate member upon movement of the control arm during a working stroke of the control lever; and (c) the releasing means comprise resilient return means acting between the intermediate member and the control arm to bias the control arm about its pivot, towards first stop means carried by the connecting arm, unlocking the locking element from said teeth when the connecting arm engages fixed second stop means upon its return stroke.

The invention will now be more particularly described, by way of example, with reference to the accompanying purely diagrammatic drawings, in which:

FIG. 1 is a side elevational view, partly in section, of a clutch for a motor vehicle fitted with a first embodiment of a device according to the invention for the automatic elimination of play in the clutch;

FIG. 2 is a side view, on an enlarged scale, of the device shown in FIG. 1,

FIG. 3 is an exploded perspective view of the device shown in FIG. 2,

FIG. 4 is a section taken along the line IV—IV of FIG. 2,

FIG. 5 is a view in the direction of arrow V of FIG. 2,

FIG. 6 is a partly cut away side elevational view, similar to FIG. 2, of a device according to a second embodiment of the invention;

FIG. 7 is an exploded perspective view of the device shown in FIG. 6;

FIG. 8 is a section taken along line VIII—VIII in FIG. 6, and

FIG. 9 is a fragmentary side view, partly in section, of a device according to a third embodiment of the invention.

The same reference numerals are used throughout the specification to designate the same or corresponding component parts of the illustrated embodiments.

As shown in FIG. 1, a motor vehicle clutch, generally indicated 1, is maintained in normally engaged position by a conical disc spring 2. A declutching lever 3 is fixed by known means to a central area of the spring 2 and is kept in contact with the spring 2 by the action of a helical tension spring 4. The declutching lever 3 is operable by a driver of the vehicle, by means of a cable 5 which is acted upon by the clutch control mechanism as described below.

The clutch control mechanism includes a control lever 6 which comprises first and second parts: the first part is a control arm 8 having a pedal 11 at its free end, to which a clutch disengaging force is applied, and the second part is a connecting arm 9 interconnecting the other end of the control 8 and a pivot pin 7 by means of which the entire control lever 6 is pivotally mounted on the vehicle body (not shown). The connecting arm 9 comprises two links 9a of equal length pivoted, at one of their respective ends, to the control arm 8 by a link pin 10 and pivoted at their other end to the pivot pin 7, as shown in FIG. 4.

One of the links 9a is provided with first stop means comprising a lateral projection 12 which abuts a cooperating surface 13 on the control arm 8 in the rest or clutch-engaged position of the control lever 6, to limit the rotation of the arm 8, relative to the connecting arm 9 when the lever 6 returns to the rest position. An intermediate elongate member 14 is interposed between the links 9a of the connecting arm 9 and is pivotable about the pivot pin 7. The member 14 has a hooked end 14a which engages a cooperating end 5a of the cable 5, the opposite end 5b of which is fixed to the free end of the declutching lever 3. The other end 14b of the member 14 has teeth 15 arranged in a sector centred upon the axis of the pivot pin 7. During the working stroke of the lever 6, the teeth are selectively engaged by toothed locking means comprising a pawl 16a carried by an arrestor element 16 formed in the adjacent end of the control arm 8. A first hook 17, formed on the control arm 8 opposite the pawl 16, engages one end of releasing means formed by a helical spring 18, the other end of which engages a second hook 19 on the intermediate member 14.

A second stop means 20, fixed to the body of the vehicle, abuts the projection 12 on the connecting arm 9 when the lever 6 is in the rest position. The lever 6 is biassed towards the rest positions by the spring 18, as shown in FIG. 1.

In a working stroke the driver depresses the pedal 11 and the control arm 8 rotates about the link pin 10, causing the pawl 16a of the arrestor element 16 selectively to engage the teeth 15 of the intermediate member 14. This locks together the control lever 6 and the intermediate member 14, which rotate about the pivot pin 7 to disengage the clutch 1 by means of the cable 5. During the return stroke, when the driver lifts his foot from the pedal 11, the control lever 6 and the intermediate member 14 remain locked together until the stop projection 12 on the connecting arm 9 abuts the second stop means 20 preventing further rotation of the connecting arm 9. This allows the spring 18 to return the control arm 8 to its rest position pivoting the arm 8 relative to the connecting arm 9 about the link pin 10 and moving the pawl 16a out of engagement with the teeth 15. The stop projection 2 abuts the surface 13 on the control arm 8, preventing further pivotal movement of the arm 8. In this rest position the intermediate member 14 is free to pivot about the pivot pin 7 and assume a position which takes up any play due to wear of the clutch plate 1a.

In subsequent working strokes the pawl 16a will selectively engage the teeth 15 according to the angular position adopted by the intermediate member 14, so eliminating play until the wear of the clutch plate 1a is such that a finger 15a on the intermediate member prevents further rotation of the intermediate member 14 relative to the control arm 8. At this stage the worn clutch plate 1a will be in need of replacement.

In FIG. 6, the first stop means comprise a bridge 12 interconnecting the links 9a of the connecting arm 9 adjacent the control arm 8. On the edge of each link 9a opposite the bridge 12 is a respective lug 28 having a respective bore 29. The links 9a retain an elongate pin 30, freely rotatable in the bores 29 between the links 9a. The pin 30 carries toothed locking means, in this case a cog 34 which meshes with the teeth 15 of the intermediate member 14. The cog 34 is coaxial with a pair of wheels 31 adjacent the links 9a and each having a knurled circumferential edge 31a. Arrestor elements 26 are secured to the link pin 10, one on each side of the control arm 8, adjacent the respective cooperating wheels 31. Each arrestor element 26 has a concavely curved surface 26a for frictional contact with the knurled edge 31a of the associated wheel 31.

When the control lever 6 is in the rest position the curved surfaces 26a of the arrestor elements 26 are not in contact with their respective cooperating wheel 31. When the driver depresses the pedal 11, however, the control arm 8 rotates, bringing the surfaces 26a of the arrestor elements into frictional contact with the wheels 31, preventing rotation of the pin 30 and the cog 34 and locking the control lever 6 with the intermediate member 14. On the return stroke the device operates as described above, with the exception that the locking element, the cog 34, is always meshed with the teeth 15 of the intermediate member 14, but is free to rotate when the control arm 8 is in its rest position.

In a third embodiment, shown in FIG. 9, which is similar to the second embodiment previously described with reference to FIG. 6, the arrestor elements 26 have convexly curved surfaces 26b for frictional engagement with the associated wheels 31.

What is claimed is:

1. Device for the automatic elimination of play in a motor vehicle clutch comprising:
   a declutching lever;
   a control lever operable by a driver of said vehicle to effect disengagement of said clutch;
   an intermediate member articulated to said control lever;
   a cable fixed at one of its ends to said intermediate member and at the other end to said declutching lever to effect said disengagement;
   locking means which effect interengagement of said control lever and said intermediate member to prevent their relative rotation; and
   releasing means for disengaging said locking means to disengage said intermediate member from said control lever, when said control lever is in a rest position, to enable said intermediate member to assume a rest position in which play resulting from wear of said clutch is taken up, wherein the improvements consist in:
   said control lever comprising first and second parts; a pivot connecting said parts; said first part being a control arm; a pedal carried by said control arm to which clutch disengaging force is applied; and said second part being a connecting arm interconnecting said control arm and said intermediate member;
   said locking means comprising at least one arrestor element carried by said control arm; a toothed locking element, and teeth on said intermediate member; said locking element cooperating with said at least one arrestor element to be locked selectively with said teeth upon movement of said control arm during a working stroke of said control lever; and
   said releasing means comprising resilient return means between said intermediate member and said control arm; first stop means carried by said connecting arm; and fixed second stop means; whereby said return means bias said control arm about said pivot towards said first stop means unlocking said locking element from said teeth when said connecting arm engages said second stop means upon its return stroke.

2. Device as defined in claim 1, wherein said toothed locking element comprises a pawl carried by said arrestor element and directly engageable with said teeth on said intermediate member.

3. Device as defined in claim 1, wherein said toothed locking element comprises a rotatable cog carried by said connecting arm and meshing with said teeth on said intermediate member and at least one wheel coaxial with and fixed to said cog; said at least one wheel has a circumferential edge; and said at least one arrestor element has a curved surface which makes frictional contact with said circumferential edge of a respective said wheel during the working stroke of the control lever to prevent rotation of the cog.

4. Device as defined in claim 3, wherein said curved surface of said at least one arrestor element is concave.

5. Device as defined in claim 3, wherein said curved surface of said at least one arrestor element is convex.

* * * * *